May 10, 1938.    C. H. H. RODANET    2,117,212
DAMPING MEANS FOR MAGNETIC SPEEDOMETERS
Filed June 30, 1936

INVENTOR:
CHARLES HILAIRE HENRI RODANET
BY Haseltine, Lake & Co.
ATTORNEYS

Patented May 10, 1938

2,117,212

UNITED STATES PATENT OFFICE 2,117,212

DAMPING MEANS FOR MAGNETIC SPEEDOMETERS

Charles Hilaire Henri Rodanet, Neuilly-sur-Seine, France, assignor to Société Anonyme: Etablissements Ed. Jaeger, Levallois-Perret, France Application June 30, 1936, Serial No. 88,085
In France July 24, 1935

2 Claims. (Cl. 264—13)

This invention relates to apparatus in which a bell or metal plate, substantially subjected to the action of a resilient returning member, is driven in antagonism to the action of this returning member by the rotation of one or more magnets the magnetic circuit of which passes through one or more parts of said bell or plate and through a stationary field member (not shown). These apparatus are well known and their main application consists in the measurement of the speeds of rotation of a shaft, more particularly to be used as speed indicator for motor vehicles.

The torque exerted on the bell or plate being relatively small, especially when the speed of rotation of the magnets is not high, the indication given by the apparatus lacks stability. For remedying this inconvenience, it has already been proposed to slightly and immediately brake the bell or plate, in order to dampen its oscillations. But this method of procedure presents an inconvenience in that it introduces a supplementary passive resistance, which is objectionable when the torque exerted on the bell or plate is small.

The invention has for object an improvement which allows of ensuring this breaking only intermittently, which is sufficient for preventing the oscillations of the bell or plate, without however introducing a too great passive resistance. For that purpose, the invention is characterized by the fact that the brake device is so devised as to be responsive to the attraction of the magnets when the poles of the latter pass in front of this brake device.

The accompanying drawing illustrates, by way of example only and diagrammatically, a form of construction of a speed indicator having a magnetic action and improved according to the invention.

Figure 1:
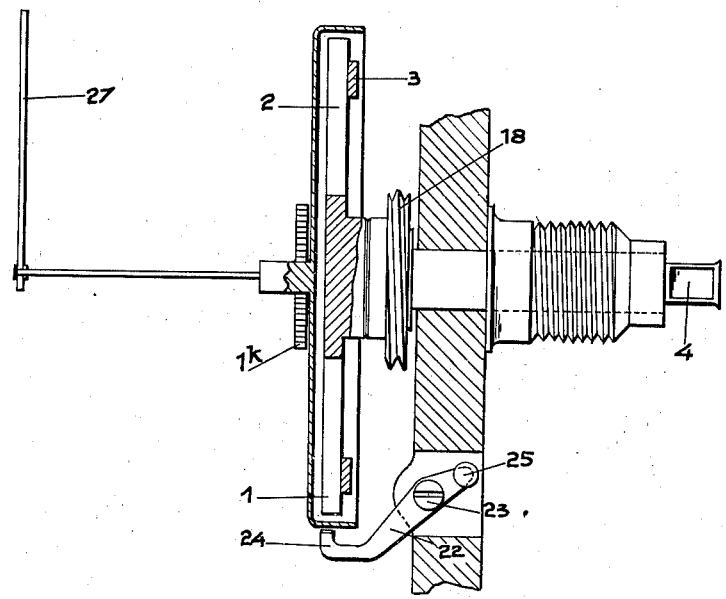
Figure 1 is a diagrammatic elevation in longitudinal axial section.
Figure 2:
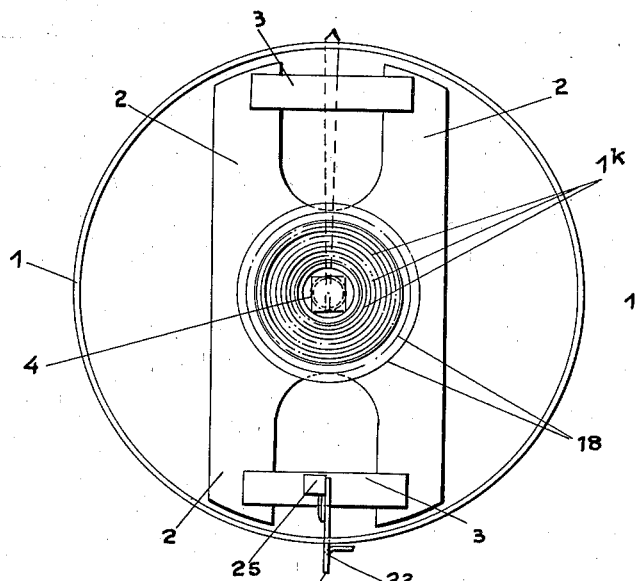
Figure 2 is a rear view.

The indicator illustrated comprises, in the usual manner, a metal bell or speed cup I which is of non-magnetic material and angularly driven, in antagonism to the action of a spiral spring I$^k$, by the rotation of a permanent magnet 2 having a magnetic shunt 3. This magnet 2 is moved by a spindle 4 connected, by means of a flexible shaft, or otherwise, to the shaft the speed of which is to be measured.

The spindle 4, which causes the rotation of the magnet 2, comprises an Archimedean screw 18 adapted to drive totalizers not shown.

The indicator previously described, by way of indication only and broadly, comprises, according to the invention, a brake acting substantially efficiently in synchronism with the rotation of the magnet 2. This brake is constituted by a lever 22 pivoted on a pin 23 which is secured for instance on the casing of the apparatus. One of the ends 24 of the lever 22 has a bent portion forming a shoe which can bear against the periphery of the bell I, whilst the other end carries a small balancing counterweight 25.

The braking action of this brake shoe 24 by pressing against the bell I is determined by the magnet 2 which attracts said shoe 24 every time it passes in front of said magnet. Thus, slight braking actions are exerted on the bell I, these braking actions being exerted in synchronism with the rotation of spindle 4 under the action of magnet 2.

In practice, it appears advantageous to make the counterweight 25 so as to balance the lever 22, in order that the brake shoe 24 should have substantially no action on the bell I between the slight applications of said brake shoe.

With the device previously described it is possible to avoid the oscillations, often important, of the bell I and, consequently, of the index 27 rigidly secured on the same shaft as this bell and which indicates instantaneous speeds.

It is obvious that the form of construction described and illustrated is given herein by way of indication only and not in a limiting sense. All changes or modifications which do not alter in any way the main characteristic features above set forth, and the desired result, remain included in the scope of the present invention.

What I claim as my invention and desire to secure by Letters Patent is:—

1. In an indicating apparatus having an oscillating indicating metal bell, a return spring for said bell, a permanent magnet rotatably driven in a constant direction and rotating within said bell in order to magnetically actuate the latter in antagonism to said return spring, a pivot fixed relatively to said bell, a lever of magnetic material pivoted on said pivot and arranged so as to be disengaged from the bell under the effect of its own weight and to come into contact with said bell and thereby braking it by the effect of the magnetic attraction exerted on this lever by said magnet when the latter passes opposite said lever.

2. In an indicating apparatus having an oscillating indicating metal bell, a return spring for said bell, a permanent magnet rotatably driven in a constant direction and rotating within said bell in order to magnetically actuate the latter in antagonism to said return spring, a pivot fixed relatively to said bell, a lever of magnetic material pivoted on said pivot, a brake shoe provided at one of the ends of said lever and a counterweight mounted at the other end of the lever, in order to balance and prevent said brake shoe from being in permanent contact with the periphery of said bell, said lever being so arranged that said brake shoe will come into contact with said bell and brake it by the effect of the magnetic attraction exerted on this lever by said magnet when the latter passes opposite said lever.

CHARLES HILAIRE HENRI RODANET.